United States Patent
Farrugia et al.

(10) Patent No.: US 9,605,171 B2
(45) Date of Patent: *Mar. 28, 2017

(54) SOLID RED INK FORMULATIONS

(71) Applicant: Xerox Corporation, Norwalk, CT (US)

(72) Inventors: Valerie M Farrugia, Oakville (CA); C Geoffrey Allen, Waterdown (CA); Jordan H Wosnick, Toronto (CA); Eric Rotberg, Toronto (CA); Karen A Moffat, Brantford (CA); Richard P N Veregin, Mississauga (CA); Suxia Yang, Mississauga (CA); Biby E Abraham, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,927

(22) Filed: Nov. 2, 2012

(65) Prior Publication Data
US 2014/0128518 A1    May 8, 2014

(51) Int. Cl.
*C09D 11/34* (2014.01)
*C09D 11/322* (2014.01)
*C09D 11/12* (2006.01)

(52) U.S. Cl.
CPC ............. *C09D 11/34* (2013.01); *C09D 11/12* (2013.01); *C09D 11/322* (2013.01)

(58) Field of Classification Search
CPC ........ C09D 11/34; C09D 11/322; C09D 11/12
USPC ...................................................... 524/210
See application file for complete search history.

(56) References Cited

U.S. PATENT DOCUMENTS

| | | | |
|---|---|---|---|
| 5,062,894 A * | 11/1991 | Schwartz ............ | C09B 67/0055 106/31.72 |
| 2003/0026993 A1* | 2/2003 | Agawa et al. ................ | 428/413 |
| 2003/0149134 A1* | 8/2003 | Modi ..................... | C09D 11/34 523/161 |
| 2003/0194554 A1* | 10/2003 | Petersen et al. ............. | 428/402 |
| 2006/0183813 A1* | 8/2006 | Modi ..................... | C09D 11/34 523/160 |
| 2008/0107987 A1* | 5/2008 | Fukushima et al. ....... | 430/108.1 |
| 2008/0190319 A1* | 8/2008 | Reisacher ............ | C08K 5/0008 106/31.86 |
| 2009/0098396 A1* | 4/2009 | Chasser ........................ | 428/457 |

FOREIGN PATENT DOCUMENTS

JP   2008-003274   * 10/2008   ............... C03G 9/08

OTHER PUBLICATIONS

Machine translation of JP 2008-003274. Oct. 2008.*

* cited by examiner

*Primary Examiner* — John Uselding
(74) *Attorney, Agent, or Firm* — Hoffman Warnick LLC

(57) ABSTRACT

A solid ink including an ink vehicle and a colorant, the colorant includes an orange colorant and a red colorant, where the orange colorant absorbs light having a wavelength of from about 400 to about 560 nm, and where the red colorant absorbs light having a wavelength of from about 510 to 580 nm. The ink substantially matches PANTONE® Red 032 or PANTONE® Warm red.

20 Claims, No Drawings

SOLID RED INK FORMULATIONS

TECHNICAL FIELD

The disclosure is directed to red solid ink compositions, methods of making red solid inks, and methods of forming images with solid inks comprising mixtures of pigment red and pigment orange.

BACKGROUND INFORMATION

A need remains for red solid ink compositions for developing higher quality color images. Standard CMYK color sets provide poor coverage of the red region of the color spectrum.

However, obtaining red inks is not as trivial as adding a single pigment colorant to an ink formulation because there are significant color differences between, for example, red variants that lie between orange and magenta which can be perceived as different by the naked eye.

As a result, there is a need for solid inks in the red region to achieve higher quality color images.

SUMMARY

The present disclosure addresses those various needs and problems by providing solid inks comprising: an ink vehicle and at least one orange pigment and at least one red pigment, where the orange pigment absorbs light having a wavelength of from about 400 to about 560 nm, and where the red pigment absorbs light having a wavelength of from about 460 to 580 nm. The red ink approximates PANTONE® Warm Red and PANTONE® Red 032 within a human perception limit ($\Delta E_{2000}$) of about 3 units or less when presented on standard photocopy paper.

In some embodiments, a solid ink composition of interest has a hue angle of from about 28° to about 37° when presented on standard paper.

In embodiments, a solid ink composition of interest has an L* value of from about 51 to about 61 when presented on standard paper.

Embodiments also include methods for making such red inks and methods of forming images with such red inks.

Those and other improvements are accomplished by the compositions and methods described in embodiments herein.

DETAILED DESCRIPTION

Before the present composition, methods and methodologies are described, it is to be understood that this subject matter is not limited to particular compositions, methods and experimental conditions described, as such compositions, methods, and conditions may vary. It is also to be understood that the terminology used herein is for purposes of describing particular embodiments only, and is not intended to be limiting. The disclosure is not limited to the particular embodiments described herein, and some components and processes may be varied by one of ordinary skill, based on the disclosure.

Exemplary ink compositions provide print quality while meeting requirements of typical printing processes. The present disclosure provides a solid ink to produce a red image comprising: an ink vehicle and a colorant, the colorant is comprised of at least one orange pigment and at least one red pigment, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm Solid ink image forming systems typically have cyan, magenta, yellow and black inks in a four print head system. In digital imaging, those colored inks are generally used by printing halftone dots in varying concentrations and combinations to form the desired image. While the halftone dots are typically small enough to be indistinguishable, the texture produced by the dots is visible, and may be unacceptable for certain high quality applications, such as, printing high quality photographs. In addition to objectionable halftone texture, even small levels of nonuniformity can lead to objectionable visible noise, such as graininess, mottle etc.

Image quality may be improved by adding one, two or more additional inks to form a system with five, six or more print heads. One color of ink that will provide value and increase image quality is red.

However, obtaining red colorant inks is not as trivial as adding a single pigment colorant to an ink formulation because there are significant color differences between, for example, red variants that lie between orange and magenta which can be perceived as different by the naked eye.

The PANTONE® Matching System of 14 color primaries includes two red variants that lie between orange and magenta on the colour wheel. As represented in the iGen PANTONE® book, PANTONE® Warm Red and PANTONE® Red 032, lie within 5.89 $\Delta E_{2000}$ units of one another. A $\Delta E_{2000}$ of about 2 to about 3 is generally considered to be at the limit of visual perception. Therefore, those two colors are visibly different to the naked eye. An ink of interest relative to PANTONE® Warm Red or PANTONE® Red 032 has a value of about 3 or less, about 2 or less, about 1 or less.

In the specification and the claims that follow, singular forms, such as, "a," "an," and, "the," include plural forms unless the content clearly dictates otherwise. All ranges disclosed herein include, unless specifically indicated, all endpoints and intermediate values. In addition, reference may be made to a number of terms that shall be defined as follows:

As used herein, "lightfastness," refers to the degree to which a dye resists fading due to light exposure. The Blue Wool Scale measures and calibrates the permanence of colouring dyes. Traditionally that test was developed for the textiles industry but now been adopted by the printing industry as measure of lightfastness of inks. Normally, two identical samples are created. One is placed in the dark as the control and the other is placed in the equivalent of sunlight for a 3-month period. A standard blue wool textile fading test card is also placed under the same light conditions as the sample under test. The amount of fading of the sample is then assessed by comparison to the original colour. A rating between 0 and 8 is awarded by identifying which one of the eight strips on the blue wool standard card has faded to the same extent as the sample under test. Zero denotes extremely poor colour fastness whilst a rating of eight is deemed not to have altered from the original and thus is credited as being lightfast and permanent. For an ink of interest, a lightfastness of about 6 or greater, about 7 or greater, about 8 or greater is desirable. Lightfastness also can be determined using the devices of Microscal Co., London, UK and Q-Lab Corp., Cleveland, Ohio.

The term, "functional group," refers, for example, to a group of atoms arranged in a way that determines the chemical properties of the group and the molecule to which it is attached. Examples of functional groups include halogen atoms, hydroxyl groups, carboxylic acid groups and the like.

As used herein, the term, "viscosity," refers to a complex viscosity, which is the typical measurement provided by a mechanical rheometer capable of subjecting a sample to a steady shear strain or a small amplitude sinusoidal deformation. In that type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, ω, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G''/\omega$ and i is $-1$. Alternatively a viscometer that can measure only the transient measurement of, for instance, a capillary or shear viscosity also can be used.

"Optional," or, "optionally," refer, for example, to instances in which subsequently described circumstance may or may not occur, and include instances in which the circumstance occurs and instances in which the circumstance does not occur.

The terms, "one or more," and, "at least one," refer, for example, to instances in which one of the subsequently described circumstances occurs, and to instances in which more than one of the subsequently described circumstances occurs.

Unless otherwise indicated, all numbers expressing quantities and conditions, and so forth used in the specification and claims are to be understood as being modified in all instances by the term, "about." "About," is meant to indicate a variation of no more than 20% from the stated value. Also used herein is the term, "equivalent," "similar," "essentially," "substantially," "approximating" and "matching," or grammatic variations thereof, have generally acceptable definitions or at the least, are understood to have the same meaning as, "about."

One skilled in the art will also readily recognize that where methods or compositions are disclosed, the disclosure encompasses not only such compositions or processes and other subcomponents or positive process steps, but may also exclude one or more components, subcomponents, functional groups, or steps therein, as used, for example, in an explicit negative limitation. The disclosure therefore envisages the explicit exclusion of any one or more components, subcomponents, functional groups, elements, species, or embodiments, including provisos that may apply to any of the disclosed embodiments, whereby any one or more components, subcomponents, elements, functional groups, species, or embodiments, may be excluded.

Ink Vehicles

In embodiments, the solid ink includes at least one ink vehicle (also known as a carrier material) or a mixture of two or more ink vehicles. The ink vehicle or mixture is solid at temperatures of about 20° C. to about 27° C., for example, room temperature, and generally is solid at temperatures below about 40° C. However, the ink vehicle changes phase on heating and is in a molten state at jetting temperatures.

In embodiments, the ink vehicle may have a melting point of from about 60° C. to about 150° C., from about 80° C. to about 120° C., from about 85° C. to about 110° C., as determined by, for example, observation and measurement on a microscope hot stage, wherein the binder material is heated on a glass slide and observed by microscope. Higher melting points are also acceptable, although print head life may be reduced at temperatures higher than about 150° C.

Any suitable ink vehicle can be employed. Suitable vehicles may include ethylene/propylene copolymers, highly branched hydrocarbons, hydrocarbon-based waxes, paraffins, high molecular weight linear alcohols, microcrystalline waxes, polyethylene waxes, ester waxes, fatty acids, other waxy materials, fatty amide-containing materials, sulfonamide materials, resinous materials made from different natural sources (tall oil rosins and rosin esters, for example), synthetic resins, oligomers, polymers, copolymers such as further discussed below, and mixtures thereof.

Examples of suitable specific ink vehicles include, for example, polyethylene, such as those available from Baker Petrolite having the following general formula:

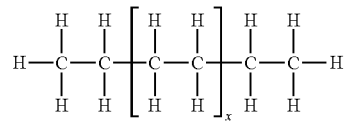

wherein x is an integer of from 1 to about 200, from about 5 to about 150, from about 12 to about 105. The materials may have a melting point of from about 60° C. to about 150° C., from about 70° C. to about 140° C., from about 80° C. to about 130° C.; and a molecular weight (Mn) of from about 100 to about 5,000, from about 200 to about 4,000, from about 400 to about 3,000. Examples of wax ink vehicles include POLYWAX 400 (Mn about 400), distilled POLYWAX 400 having a viscosity of about 10% to about 100% higher than the viscosity of the undistilled POLYWAX 400 at about 110° C., POLYWAX 500 (Mn about 500), distilled POLYWAX 500 having a viscosity of about 10% to about 100% higher than the viscosity of the undistilled POLYWAX 500 at about 110° C., POLYWAX 655 (Mn about 655), distilled POLYWAX 655 having a viscosity of about 10% to about 50% lower than the viscosity of the undistilled POLYWAX 655 at about 110° C., and distilled POLYWAX 655 having a viscosity of about 10% to about 50% higher than the viscosity of the undistilled POLYWAX 655 at about 110° C., POLYWAX 850 (Mn about 850), POLYWAX 1000 (Mn about 1,000) and the like.

Further examples include ethylene/propylene copolymers, such as those available from Baker Petrolite having the following general formula:

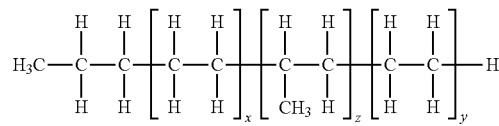

wherein z represents an integer from 0 to about 30, from 0 to about 20, from 0 to about 10; y represents an integer from 0 to about 30, from 0 to about 20, from 0 to about 10;

and x is equal to about 21-y. The distribution of the side branches may be random along the carbon chain. The copolymers may have, for example, a melting point of from about 70° C. to about 150° C., from about 80° C. to about 130° C., from about 90° C. to about 120° C.; and a molecular weight range of from about 500 to about 4,000. Commercial examples of such copolymers include, for example, PETROLITE CP-7 (Mn=650), PETROLITE CP-11 (Mn=1,100), PETROLITE CP-12 (Mn=1,200) and the like.

Additional examples include highly branched hydrocarbons, typically prepared by olefin polymerization, such as, the VYBAR materials available from Baker Petrolite, including VYBAR 253 (Mn=520), VYBAR 5013 (Mn=420) and the like. Another type of ink vehicle may be n-paraffinic, branched paraffinic and/or aromatic hydrocarbons, typically with from about 5 to about 100, from about 20 to about 180, from about 30 to about 60, prepared by refining naturally occurring hydrocarbons, such as, BE SQUARE 185 and BE SQUARE 195, with molecular weights (Mn) of from about 100 to about 5,000, from about 250 to about 1,000, from about 500 to about 800, for example such as those available from Baker Petrolite.

Another example includes modified maleic anhydride hydrocarbon adducts of polyolefins prepared by graft copolymerization, such as those available from Baker Petrolite and of the following general formulae:

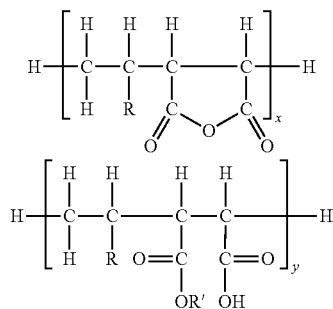

wherein R is an alkyl group with from about 1 to about 50, from about 5 to about 35, from about 6 to about 28 carbon atoms; R' is an ethyl group, a propyl group, an isopropyl group, a butyl group, an isobutyl group or an alkyl group with from about 5 to about 500, from about 10 to about 300, from about 20 to about 200 carbon atoms; x is an integer of from about 9 to about 13; and y is an integer of from about 1 to about 50, from about 5 to about 25, from about 9 to about 13. The above materials have melting points of from about 50° C. to about 150° C., from about 60° C. to about 120° C., from about 70° C. to about 100° C.

The above materials also include those materials available from Baker Petrolite and of the general formula:

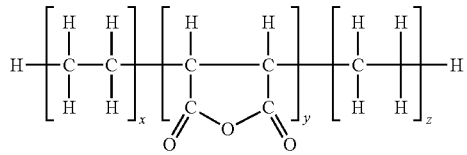

wherein x is an integer of from about 1 to about 50, from about 5 to about 25, from about 9 to about 13; y is 1 or 2; and z is an integer of from about 1 to about 50, from about 5 to about 25, from about 9 to about 13.

The above materials also include those available from Baker Petrolite and of the general formula:

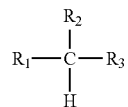

wherein $R_1$ and $R_3$ are hydrocarbon groups and $R_2$ is either of one of the general formulae:

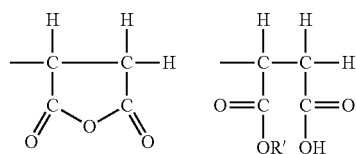

or a mixture thereof, wherein R' is an isopropyl group. The materials may have melting points of from about 70° C. to about 150° C., from about 80° C. to about 130° C., from about 90° C. to about 125° C., with examples of modified maleic anhydride copolymers including CERAMER 67 (Mn=655, Mw/Mn=1.1), CERAMER 1608 (Mn=700, Mw/Mn=1.7) and the like.

Further examples include high molecular weight linear alcohols, such as those available from Baker Petrolite and of the general formula:

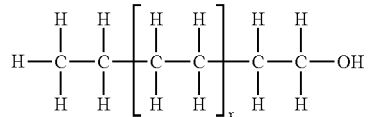

wherein x is an integer of from about 1 to about 50, from about 5 to about 35, from about 11 to about 23. Those materials may have a melting point of from about 50° C. to about 150° C., from about 70° C. to about 120° C., from about 75° C. to about 110° C.; and a molecular weight range of from about 100 to about 5,000, from about 200 to about 2,500, from about 300 to about 1,500. Commercial examples include the UNILIN materials, such as, UNILIN 425 (Mn=460), UNILIN 550 (Mn=550), UNILIN 700 (Mn=700), and the like.

In addition, the ink vehicle may be an ethoxylated alcohol, such as available from Baker Petrolite and of the general formula:

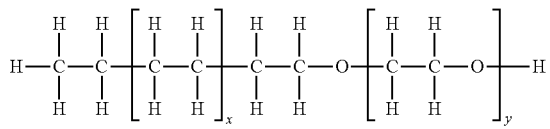

wherein x is an integer of from about 1 to about 50, from about 5 to about 40, from about 11 to about 24; and y is an integer of from about 1 to about 70, from about 1 to about 50, from about 1 to about 40. The materials may have a melting point of from about 60° C. to about 150° C., from about 70° C. to about 120° C., from about 80° C. to about 110° C.; and a molecular weight range of from about 100 to about 5,000, from about 500 to about 3,000, from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

In addition, the ink vehicles described in U.S. Pat. No. 6,906,118, incorporated herein by reference in entirety, also may be used. Also suitable as ink vehicles are liquid crystalline materials as disclosed in, for example, U.S. Pat. No. 5,122,187, the disclosure of which is incorporated herein by reference in entirety.

Urethane, urea, amide and imide derivatives of oxidized synthetic or petroleum waxes, such as those available from Baker Petrolite having the following general formulae may also be used as the ink vehicle:

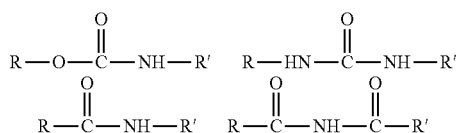

wherein R is an alkyl group of the formula $CH_3(CH_2)_n$; n is an integer of from about 5 to about 400, from about 10 to about 300, from about 20 to about 200; and R' is a tolyl group. In embodiments, the urethane, urea, amide and imide derivatives may be linear, branched, cyclic and any combination thereof. The materials may have a melting point of from about 60° C. to about 120° C., from about 70° C. to about 100° C., from about 70° C. to about 90° C. Commercial examples of such materials include, for example, bis-urethanes, such as, PETROLITE CA-11, PETROLITE WB-5 and PETROLITE WB-17, all available from Baker Petrolite, and the like. Suitable examples also include urethane, urea, amide and imide derivatives disclosed in U.S. Pat. Nos. 6,620,228, 6,380,423, 6,464,766 and 6,309,453, each of which is incorporated herein by reference.

Additional resins and waxes may further be selected from the group consisting of a urethane resin obtained from the reaction of two equivalents of ABITOL E hydroabietyl alcohol and one equivalent of isophorone diisocyanate, prepared as described in U.S. Pat. No. 5,782,996, the disclosure of which is totally incorporated herein by reference; a urethane resin that was the adduct of three equivalents of stearyl isocyanate and a glycerol base alcohol, prepared as described in Example 4 of U.S. Pat. No. 6,309,453 the disclosure of which is incorporated herein by reference; and suitable amides including, for example, diamides, triamides, tetra-amides, cyclic amides and the like. Fatty amides including monoamides, tetra-amides and mixtures thereof, may also be included in the ink vehicle, such as, for example, those described in U.S. Pat. Nos. 4,889,560, 4,889, 761, 5,194,638, 4,830,671, 6,174,937, 5,372,852, 5,597,856, and 6,860,930 and GB Pat. No. GB 2 238 792, the entire disclosure of each is incorporated herein by reference; and those similar to what is described in U.S. Pat. No. 6,620,228, which is incorporated herein by reference in entirety.

Fatty amides, such as monoamides, tetra-amides, mixtures thereof and the like, such as those described in U.S. Pat. No. 6,858,070, incorporated herein by reference, may also be used. Suitable monoamides may have a melting point of at least about 50° C., from about 50° C. to about 150° C., although the melting point can be below those temperatures. Specific examples of suitable monoamides include primary monoamides and secondary monoamides. Exemplary primary monoamides include stearamide, such as, KEMAMIDE S available from Chemtura Corp. and CRODAMIDE S available from Croda; behenamide/arachidamide, such as, KEMAMIDE B available from Chemtura and CROD-AMIDE BR available from Croda; oleamide, such as, KEMAMIDE U available from Chemtura and CROD-AMIDE OR available from Croda, technical grade oleamide, such as, KEMAMIDE O available from Chemtura, CRODAMIDE O available from Croda, UNISLIP 1753 available from Uniqema; erucamide, such as, KEMAMIDE E available from Chemtura and CRODAMIDE ER available from Croda. Exemplary secondary amides include behenyl behenamide, such as, KEMAMIDE EX666 available from Chemtura; stearyl stearamide, such as, KEMAMIDE S-180 and KEMAMIDE EX-672 available from Chemtura; stearyl erucamide, such as, KEMAMIDE E-180 available from Chemtura and CRODAMIDE 212 available from Croda; erucyl erucamide, such as, KEMAMIDE E-221 available from Chemtura; oleyl palmitamide, such as, KEMAMIDE P-181 available from Chemtura and CRODAMIDE 203 available from Croda; and erucyl stearamide, such as, KEMAMIDE S-221 available from Chemtura. Additional suitable amide materials include KEMAMIDE W40 (N,N'-ethylenebisstearamide), KEMAMIDE P181 (oleyl palmitamide), KEMAMIDE W45 (N,N'-thylenebisstearamide) and KEMAMIDE W20 (N,N-ethylenebisoleamide).

Further resins suitable for use herein include triamides, such as those disclosed in U.S. Pat. No. 6,860,930 and U.S. Pub. No. 2008/0098929 (the entire disclosure of each of which is incorporated herein by reference). Triamides suitable for use include linear triamides, which are molecules where all three amide groups are drawn in the same molecular chain or branch. Examples of linear triamides include those triamides having the following formulae:

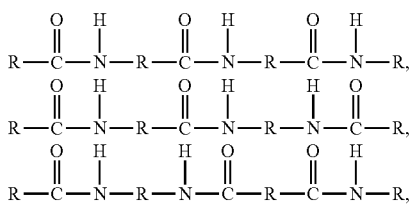

R can be any hydrocarbon having from about 1 to about 200 carbon atoms, from about 25 to 150, from about 30 to about 100.

An example of a linear triamide can be expressed by the following formula:

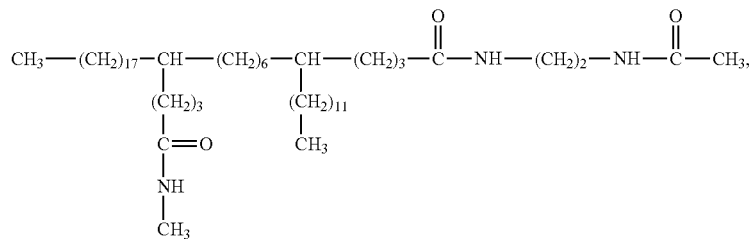

which can also be drawn as:

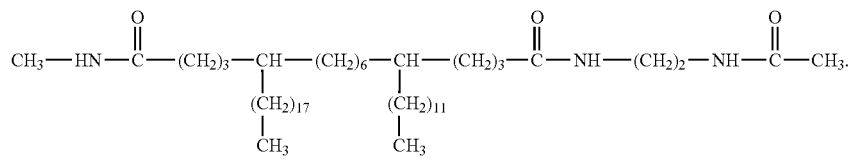

In embodiments, the triamide may also be a branched triamide. Examples of suitable branched triamides include those triamides disclosed in U.S. Pat. No. 6,860,930 and U.S. Pub. No. 2008/0297556, each of which is incorporated herein in entirety by reference. Any branched triamide disclosed in U.S. Pat. No. 6,860,930 and U.S. Pub. No. 2008/0297556, is suitable for use herein.

Additional examples of suitable ink vehicles for the solid inks include rosin esters, such as glyceryl abietate (KE-100®); polyamides; dimer acid amides; fatty acid amides, including ARAMID C; epoxy resins, such as, EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as, BENZOFLEX 5552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as, DUREZ 12 686, available from Occidental Chemical Company; and natural product waxes, such as, beeswax, montan wax, candelilla wax, GILSONITE (American Gilsonite Company), and the like; mixtures of linear primary alcohols with linear long-chain amides or fatty acid amides, such as, those with from about 6 to about 24 carbon atoms, including PARICIN 9 (propylene glycol monohydroxystearate), PARICIN 13 (glycerol monohydroxystearate), PARKIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide); and the like. Further, linear long chain sulfones with from about 4 to about 16 carbon atoms, such as, diphenyl sulfone, n-amyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone and the like.

The ink vehicle may comprise from about 25% to about 99.5% by weight of the ink, from about 30% to about 98%, from about 50% to about 85%.

Colorants

In embodiments, the solid ink includes a mixture of two or more colorants. As used herein the term, "colorant," includes pigments, dyes, mixtures of dyes, mixtures of pigments, mixtures of dyes and pigments and the like.

In embodiments, "red," inks match PANTONE® Red 032 and PANTONE® Warm Red when printed on standard paper. The inks use standard pigments that are lightfast and known to be compatible with the ink formulation. More specifically, the ink to produce a red image is comprised of at least one orange pigment and at least one red pigment, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm.

Measurement of the color can, for example, be characterized by CIE specifications, commonly referred to as CIE $L^*$, $a^*$ and $b^*$, where $L^*$, $a^*$ and $b^*$ are the modified opponent color coordinates, which form a 3 dimensional space, with $L^*$ characterizing the lightness of a color, $a^*$ approximately characterizing the redness/greenness and $b^*$ approximately characterizing the yellowness/blueness of a color. The pigment concentration should be chosen so that lightness ($L^*$) corresponds with the desired ink mass on the substrate. All of the parameters may be measured with any industry standard spectrophotometer including those obtained, for example, from X-Rite Corporation. Color differences may be quantified as $\Delta E$, or the color difference between a sample color and a reference color. $\Delta E$ may be calculated by any acceptable formula known in the art, for example, by using the CIE $\Delta E_{2000}$ formula. The $L^*$, $a^*$ and $b^*$ data required for determining $\Delta E_{2000}$ may be calculated, for example, under D50 illuminant and 2° observer, using reflectance spectra which may be measured with a spectrophotometer, for example, a GretagMacbeth SPECTROLINO® spectrophotometer. Suitable $L^*$ values are about 49 to about 63, from about 51 to about 61, from about 53 to about 60. Suitable hue angles are from about 25° C. to about 39°, from about 27° C. to about 37°, from about 29° C. to about 35°.

In red solid ink compositions, the target color for the red substantial match or substantially the same match as the color PANTONE® Warm Red and PANTONE® Red 032. Colors are, "substantially," the same when the colors have a $\Delta E_{2000}$ color difference is about 3 or less, about 2 or less, about 1 or less. Thus, a red ink may include, for example, inks having similar color compared to the conventional PANTONE® Warm Red or PANTONE® Red 032 color.

In embodiments, red inks are produced by combining a red or orange colorant with an optional hue-adjusting colorant and an optional shade-adjusting colorant. Each of the hue-adjusting and shade-adjusting colorants may be a single colorant or a combination of colorants, and the red, orange, hue-adjusting, and shade-adjusting colorants may be different from each other.

In embodiments, the red inks of interest disclosed herein may contain any suitable red or orange colorant. Red or orange colorants include a colorant or combination of colorants that absorb wavelengths of light from about 380 to about 530 nm. More specifically, red and orange colorants with a significant absorption of light in the wavelength range from about 380 to about 530 nm may be used. "Significant absorption," in embodiments encompasses absorption which is at least about 80% of the peak absorption in the visible range. Red colorants may include both dyes and pigments listed according to Colour Index Generic Names and Colour Index Constitution Numbers such as C.I. Pigment Red (PR) 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 170:1, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245 and combinations thereof.

The orange colorant may include colorants such as C.I. Pigment Orange (PO) 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 66 and combinations thereof.

The red colorant and orange colorant may be present in an amount of from about 0.05% to about 6% by weight of the ink, from about 0.1% to about 4%, from about 0.2% to about 1.5% by weight of the ink.

In embodiments, hue-adjusting colorants for a red ink may include a colorant or combination of colorants, where the orange pigment is absorbing in the wavelength region of about 400 to about 560 nm (up to about 5% reflectance), partially transmissive in the region from about 560 to about 570 nm (such that the reflectance is greater than about 5% but less than about 30%) and transmissive in the region from about 570 to 700 nm (such that the reflectance is greater than about 30%), and where the red pigment is minimally transmissive (5-15% reflectance) in the wavelength region of about 380 to about 510, absorbing (<5% reflectance) in the wavelength region of about 510 to about 580 nm, partially transmissive in the wavelength region from about 580 to about 590; and transmissive in the wavelength region from about 590 to about 700 nm.

Thus, hue-adjusting colorants with a significant absorption of light in the wavelength range from about 380 to about 580 nm may be used. Examples include red and orange colorants such as C.I. Pigment Red 57:1, C.I. Pigment Red 81:2, C.I. Pigment Red 122, C.I. Pigment Red 184, C.I. Pigment Red 185, C.I. Pigment Red 238, C.I. Pigment Red 269, C.I. Solvent Red 49, C.I. Solvent Red 52, C.I. Solvent Red 151, C.I. Solvent Red 155, C.I. Solvent Red 172, C.I. Solvent Orange 41, C.I. Solvent Orange 62 and combinations thereof. The hue-adjusting colorant may be present in an amount of from about 0.001% to about 1% by weight of the ink, from about 0.04% to about 0.2% by weight of the ink.

In embodiments, shade-adjusting colorants for a red ink may include a colorant or combination of colorants that absorb wavelengths of light from about 400 to about 500 nm More specifically, shade-adjusting colorants with a significant absorption of light in the wavelength range from about 400 to about 500 nm may be used. Examples include yellow, orange, red and black colorants such as C.I. Pigment Yellow 12, C.I. Pigment Yellow 17, C.I. Pigment Yellow 74, C.I. Pigment Yellow 83, C.I. Pigment Yellow 97, C.I. Pigment Yellow 139, C.I. Pigment Yellow 155, C.I. Pigment Yellow 180, C.I. Pigment Orange 2, C.I. Pigment Orange 5, C.I. Pigment Orange 38, C.I. Pigment Orange 64, C.I. Pigment Red 4, C.I. Pigment Red 38, C.I. Pigment Red 66, C.I. Pigment Red 119, C.I. Pigment Red 178, Carbon Black, C.I. Solvent Yellow 16, C.I. Solvent Yellow 93, C.I. Solvent Yellow 104, C.I. Solvent Yellow 163, C.I. Solvent Yellow 141, C.I. Solvent Red 111, C.I. Solvent Black 7, C.I. Solvent Black 27, C. I. Solvent Black 45 and combinations thereof. The shade-adjusting colorant may be present in an amount of from about 0.001% to about 0.6% by weight of the ink, from about 0.002% to about 0.55%, from about 0.003% to about 0.5% by weight of the ink.

In embodiments, the total colorant may comprise from about 0.1% to about 10% by weight of the ink, from about 0.15% to about 7.5%, from about 0.2% to about 5% by weight of the ink.

In embodiments, the red solid ink is substantially the same as PANTONE® Warm Red and comprises C.I. PO 34 in an amount of from about 0.5 wt % to about 2.5 wt %; from about 0.7 to about 2 wt %, from about 0.8 to about 1.5 wt %; and PR170 in an amount of from about 1.5 to about 4 wt %, from about 1.75 to about 3.5 wt %, from about 2 to about 3 wt %.

In embodiments, the red solid ink is substantially the same as PANTONE® Red 032 and comprises PO 34 in an amount of from about 0.1 wt % to about 0.75 wt %; from about 0.15 to about 0.6 wt %, from about 0.2 to about 0.5 wt %; and PR 170 in an amount of from about 1 to about 5 wt %, from about 1.5 to about 4.5 wt %, from about 2 to about 4 wt %.

Colorants suitable for use herein include pigment particles having an average particle size of from about 15 nm to about 500 nm, such as from about 50 nm to about 200 nm in volume average diameter.

Additional Additives

The ink of embodiments may further include conventional additives to take advantage of the known functionality associated with such conventional additives. Such additives may include, for example, dispersants, propellants, biocides, defoamers, slip and leveling agents, plasticizers, viscosity modifiers, antioxidants, UV absorbers, tackifiers, adhesives, conductivity enhancing agents etc.

DISPERSANTS. To enable dispersion of the pigment colorants in the liquid vehicle, a dispersant or combination of dispersants may optionally be provided. Typically, dispersants may be used to stabilize particles in the non-polar ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions and the like.

Thus, examples of suitable first functional groups that anchor the dispersant to the pigment particles include such functional groups as esters, amides, carboxylic acids, hydroxyl groups, anhydrides, urethanes, ureas, amines, amides, salt groups, such as, quaternary ammonium salts, and the like. The first functional groups anchor the dispersant to the colorant particles such that the dispersant is, for example, adsorbed, attached to or grafted on the pigment particle. Likewise, examples of the second functional groups that are compatible with the ink vehicle include groups, such as, alkyl groups, which can be straight or branched, saturated or unsaturated, and the like. The second functional groups can be compatible with a low polarity ink vehicle component.

Examples of suitable dispersants that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -2025, -2035, -2040, -2021, -3600, -3232; SOLSPERSE 13240, 16000, 17000, 17940, 19000, 28000, 32500, 38500, 39000, 54000 (Lubrizol); and mixtures thereof. Individual dispersants or combinations may optionally be used with synergists including SOLSPERSE 5000, 12000, 22000 (Lubrizol); DISPERBYK-108, -163, -167, 182 (BYK-Chemie); and K-SPERSE 132, XD-A503, XD-A505 (King Industries).

The dispersant may be present in the solid ink in any effective amount, such as, in amounts of from about 0.5% to about 40% by weight of the ink, from about 5% to about 25%, from about 8% to about 13%.

PLASTICIZERS. The ink may include an optional plasticizer, such as UNIPLEX 250 (commercially 20 available from Uniplex); the phthalate ester plasticizers commercially available from Monsanto under the trade name SANTI-CIZER, dioctyl phthalate, diundecyl phthalate, alkylbenzyl phthalate (SANTICIZER 278); triphenyl phosphate (commercially available from Monsanto); KP-140, a tributoxyethyl phosphate (commercially available from FMC Corp.); MORFLEX® 150, a dicyclohexyl phthalate (commercially available from Morflex Chemical Co., Inc.); trioctyl trimellitate (commercially available from Eastman. Kodak Co.); pentaerythritol tetrabenzoate, commercially available as BENZOFLEX 5552 (Velsicol Chemical Corp.); trimethyl titrate, commercially available as CITROFLEX 1 (Monflex Chemical Co.); N,N-dimethyl oleamide, commercially available as HALCOMID M-18-OL (C. P. Hall Co.); a benyl phthalate, commercially available as SANTICTZER 278 (Ferro Corp.); and the like.

Plasticizers may either function as the ink vehicle or may act as an agent to provide compatibility of the reagents. In embodiments, if the plasticizer functions as the ink vehicle, it may constitute from about 1% to 100% of the ink vehicle component of the ink. Alternatively, if the plasticizer functions as an additive in addition to another ink vehicle, the plasticizer may be present in an amount of at least about 0.05% by weight of the ink, at least about 1%, at least about 2%.

VISCOSITY MODIFIERS. The ink may further include an optional viscosity modifier. Examples of suitable viscosity modifiers include aliphatic ketones; stearone; 2-hydroxybenzyl alcohol; 4-hydroxybenzyl alcohol; 4-nitrobenzyl alcohol; 4-hydroxy-3-methoxy benzyl alcohol; 3-methoxy-4-nitrobenzyl alcohol; 2-amino-5-chlorobenzyl alcohol; 2-amino-5-methylbenzyl alcohol; 3-amino-2-methylbenzyl alcohol; 3-amino-4-methyl benzyl alcohol; 2(2-(aminomethyl)phenylthio)benzyl alcohol; 2,4,6-trimethylbenzyl alcohol; 2-amino-2-methyl-1,3 -propanediol; 2-amino-1-phenyl-1,3-propanediol; 2,2-dimethyl-1-phenyl-1,3-propanediol; 2-bromo-2-nitro-1,3-propanediol; 3-Cert-butylamino-1,2-propanediol; 1,1-diphenyl-1,2-propanediol; 1,4-dibromo-2,3-butanediol; 2,3-dibromo-1,4-butanediol; 2,3-dibromo-2-butene-1,4-diol; 1,1,2-triphenyl-1,2-ethanediol; 2-naphthalenemethanol; 2-methoxy-1-naphthalenemethanol; decafluoro benzhydrol; 2-methylbenzhydrol; 1-benzeneethanol; 4,4'-isopropylidene bis(2-(2,6-dibromo phenoxy)ethanol); 2,2'-(1,4-phenylenedioxy)diethanol; 2,2-bis(hydroxymethyl)-2,2',2"-nitrilotriethanol; di(trimethylolpropane); 2-amino-3-phenyl-1-propanol; tricyclohexylmethanol; tris(hydroxymethyl)aminomethane succinate; 4,4'-trimethylene bis(1-piperidine ethanol); N-methyl glucamine; xylitol; or mixtures thereof. When present, the viscosity modifier is present in the ink in any effective amount, such as at least 10% by weight of the ink, no more than about 30%, no more than about 15%, or from about 30% to about 55%, from about 35% to about 50%.

ANTIOXIDANTS. The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corp.), (2) 2,2-bis(4-(2-(3,5-di-tert-butyl-4-hydroxyhydrocinnamoyloxy))ethoxyphenyl)-propane (TOPANOL-205, available from ICI America Corp.), (3) tris(4-tert-butyl-3-hydroxy-2,6-dimethyl benzyl) isocyanurate (CYANOX 1790, 41,322-4, LTDP, Aldrich D12,840-6), (4) 2,2'-ethylidene bis(4,6-di-tert-butylphenyl) fluoro phosphonite (ETHANOX-398, available from Ethyl Corp.), (5) tetrakis(2,4-di-tert-butylphenyl)-4,4'-biphenyl diphosphonite (ALDRICH 46,852-5; hardness value 90), (6) pentaerythritol tetrastearate (TCI America #P0739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16)

2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) .alpha.-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis(trifluoromethyl)benzoic acid (Aldrich 32,527-9), (30) ethyl-2-(4-(4-(trifluoromethyl)phenoxy) phenoxy)propionate (Aldrich 25,074-0), (31) tetrakis(2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Co.) and the like, as well as mixtures thereof. The antioxidant, when present, may be present in the ink in any desired or effective amount, such as from about 0.25% to about 10% by weight of the ink, from about 1% to about 5%.

UV ABSORBERS. The ink may also optionally contain a UV absorber. The optional UV absorbers primarily protect the generated images from UV degradation. Specific examples of suitable UV absorbers include (1) 2-bromo-2',4-dimethoxyacetophenone (Aldrich 19,948-6), (2) 2-bromo-2',5'-dimethoxyacetophenone (Aldrich 10,458-2), (3) 2-bromo-3'-nitroacetophenone (Aldrich 34,421-4), (4) 2-bromo-4'-nitroacetophenone (Aldrich 24,561-5), (5) 3',5'-diacetoxyacetophenone (Aldrich 11,738-2), (6) 2-phenylsulfonyl acetophenone (Aldrich 34,150-3), (7) 3'-aminoacetophenone (Aldrich 13,935-1), (8) 4'-aminoacetophenone (Aldrich A3,800-2), (9) 1H-benzotriazole-1-acetonitrile (Aldrich 46,752-9), (10) 2-(2H-benzotriazol-2-yl)-4,6-di-tert-pentylphenol (Aldrich 42,274-6), (11) 1,1-(1,2-ethane-diyl) bis(3,3,5,5-tetramethylpiperazinone) (commercially available from Goodrich Chemicals), (12) 2,2,4-trimethyl-1,2-hydroquinoline (commercially available from Mobay Chemical), (13) 2-(4-benzoyl-3-hydroxy phenoxy)ethylacrylate, (14) 2-dodecyl-N-(1,2,2,6,6-pentamethyl-4-piperidinyl)succinimide (commercially available from Aldrich Chemical Co., Milwaukee, Wis.), (15) 2,2,6,6-tetramethyl-4-piperidinyl/β-tetramethyl-3,9-(2,4,8,10-tetraoxo spiro(5,5)-undecane)diethyl-1,2,3,4-butane tetracarboxylate (commercially available from Fairmount), (16) N-(p-ethoxycarbonylphenyl)-N'-ethyl-N'-phenylformadine (commercially available from Givaudan), (17) 6-ethoxy-1,2-dihydro-2,2,4-trimethylquinoline (commercially available from Monsanto Chemicals), (18) 2,4,6-tris-(N-1,4-dimethylpentyl-4-phenylenediamino)-1,3,5-triazine (commercially available from Uniroyal), (19) 2-dodecyl-N-(2,2,6,6-tetrame-thyl-4-piperidinyl)succinimide (commercially available from Aldrich Chemical Co.), (20) N-(1-acetyl-2,2,6,6-tetramethyl-4-piperidinyl)-2-dodecyl succinimide (commercially available from Aldrich Chemical Co.), (21) (1,2,2,6,6-pentamethyl-4-piperidinyl/beta.-tetramethyl-3,9-(2,4,8,10-tetra oxo-spiro-(5,5)undecane)diethyl)-1,2,3,4-butane tetracarboxylate (commercially available from Fairmount), (22) (2,2,6,6-tetramethyl-4-piperidinyl)-1,2,3,4-butane tetracarboxylate (commercially available from Fairmount), (23) nickel dibutyl dithio carbamate (commercially available as UV-CHEK® AM-105 from Ferro), (24) 2-amino-2',5-dichlorobenzophenone (Aldrich 10,515-5), (25) 2'-amino-4',5'-dimethoxyacetophenone (Aldrich 32,922-3), (26) 2-benzyl-2-(dimethylamino)-4'-morpholino butyrophenone (Aldrich 40,564-7), (27) 4'-benzyloxy-2'-hydroxy-3'-methylacetophenone (Aldrich 29,884-0), (28) 4,4'-bis(diethylamino)benzpshenone (Aldrich 16,032-6), (29) 5-chloro-2-hydroxy benzophenone (Aldrich C4,470-2), (30) 4'-piperazinoacetophenone (Aldrich 13,646-8), (31) 4'-piperidinoacetophenone (Aldrich 11,972-5), (32) 2-amino-5-chlorobenzophenone (Aldrich A4,556-4), (33) 3,6-bis(2-methyl-2-morpholinopropionyl)-9-octylcarbazole (Aldrich 46,073-7), and the like, as well as mixtures thereof.

TACKIFIERS. The ink may also optionally include tackifiers, such as, FORAL 85, a glycerol ester of hydrogenated abietic (rosin) acid (commercially available from Hercules), FORAL 105, a pentaerythritol ester of hydroabietic (rosin) acid (commercially available from Hercules), CELLOLYN 21, a hydroabietic (rosin) alcohol ester of phthalic acid (commercially available from Hercules), ARAXAWA KE-311 Resin, a triglyceride of hydrogenated abietic (rosin) acid (commercially available from Arakawa Chemical Ind., Ltd.), synthetic polyterpene resins such as NEVTAC 2300, NEVIAC 100, and NEVRAC 80 (commercially available from Neville Chemical Co.), WINGTACK 86, a modified synthetic polyterpene resin (commercially available from Goodyear), and the like. The tackifier, when present, may be present in the ink in any desired or effective amount, such as at least about 0.1% by weight of the ink, at least about 5%, at least about 10%, or no more than about 50%, although the amount can be outside of those ranges.

CONDUCTIVITY ENHANCING AGENTS. An optional conductivity enhancing agent may also be included. Many ink vehicles of solid inks have an electrical conductivity of essentially zero. Thus, conductivity enhancing agents may be added to the ink vehicle to provide consistent conductivity to the ink. The conductivity is used as an input signal for a level sensor in the ink reservoir of the ink jet device.

In embodiments, the conductivity enhancing agent may be an organic salt formed from an organic base and an acid. The organic base of the organic salt of the conductivity enhancing agent may be an organic amine and have at least one long hydrocarbon chain. "Long hydrocarbon chain," refers to, for example, a linear or branched carbon alkyl or aryl chain having from about 10 carbons to about 50 carbons, such as from about 15 to about 40 carbons or from about 15 carbons to about 30 carbons. The long carbon chain of the organic salt allows it to be miscible in the ink vehicle.

Unless otherwise required, the optional additives, when present may each, or in combination, be present in the ink in any desired or effective amount, such as from about 0.1% to about 10% by weight of the ink, from about 3% to about 5%.

In embodiments, the solid ink may also optionally contain other materials, which may depend on the type of printer in which the ink is used. For example, the ink vehicle composition is typically designed for use in either a direct printing mode or an indirect or offset printing transfer system.

Ink Preparation

In embodiments, the pigmented phase change ink can be prepared by the concurrent processing of the at least two pigments in a suitable carrier such as by high shear processing, attrition, ball-milling and the like.

In other embodiments, the ink can be formed from; 1) by first the formation of a pigment concentrate such as by processing of the at least two pigments in at least one component of a suitable carrier such as by high shear processing, attrition, ball-milling and the like and then adding to or being added with; 2) a carrier containing suitable phase change ink components to form; 3) the pigmented phase change ink.

In still other embodiments, the ink can be formed from the blending of individually processed pigmented phase change inks or concentrates therein.

The ink compositions can be prepared by any desired or suitable methods. For example, the components of the ink vehicle can be mixed together, followed by heating the mixture to at least its melting point (for example, from about 60° C. to about 150° C., from about 80° C. to about 120° C., from about 85° C. to about 110° C.). The colorants may be added before the ink ingredients have been heated or after the ink ingredients have been heated. The molten mixture may be subjected to simple stir mixing, high shear mixing or grinding; for example, in a high shear mixer, in an extruder, in a media mill, in a ball mill, in a homogenizer, or in combinations of the apparatus, to effect dispersion of the colorants in the ink carrier to obtain a substantially stable, homogeneous and uniform melt. The resulting melt can be further mixed, and subjected to further mixing or grinding, with other ink ingredients to fine tune properties for a particular printing system. The resulting ink is then filtered at 120° C. and cooled to ambient temperature (typically from about 20° C. to about 25° C.). The inks are solid at ambient temperature. In an embodiment, during the formation process, the molten inks are poured into molds and then cooled to form solid ink sticks. Suitable ink preparation techniques are disclosed in U.S. Pat. No. 7,186,762, the disclosure of which is incorporated herein by reference in entirety.

In embodiments, the inks have a viscosity of from about 1 to about 40 centipoise (cP), from about 5 to about 15 cP, from about 8 to about 12 cP, at an elevated temperature suitable for ink jet printing, such as temperatures of from about 50° C. to about 150° C., from about 70° C. to about 130° C., from about 80° C. to about 130° C. The inks may jet at lower temperatures and, thus, require lower amounts of energy for jetting. In that regard, the inks herein may be low energy inks. Low energy inks have a jetting viscosity of about 9 to about 13 cP, from about 10 to about 11 cP, from about 10.25 to about 10.75 cP, at jetting temperatures of about 107° C. to about 111° C., although the viscosity and temperature values can be outside those ranges.

In embodiments, the red solid inks, when printed on paper, have a mass of from about 0.1 to about 1.5 mg/cm$^2$, from about 0.4 to about 0.7 mg/cm$^2$.

Image Forming and Inkjet Devices

Solid ink jet processes are well known and are described, for example, in U.S. Pat. Nos. 4,601,777, 4,251,824, 4,410,899, 4,412,224 and 4,532,530, the disclosure of each of which is incorporated herein by reference in entirety.

Printed images may be generated with the ink described herein by incorporating the ink into an inkjet device, for example a thermal inkjet device, an acoustic inkjet device or a piezoelectric inkjet device, and concurrently causing droplets of the molten ink to be ejected in an imagewise manner onto a substrate. The ink is typically included in at least one reservoir connected by any suitable feeding device to the ejecting channels and orifices of the inkjet head for ejecting the ink. In the jetting procedure, the inkjet head may be heated, by any suitable method, to the jetting temperature of the inks. The reservoir(s) containing the solid ink may also include heating elements to heat the ink. The solid inks are thus transformed from the solid state to a molten state for jetting. "At least one or one or more," as used to describe components of the inkjet device, such as the ejecting channels, orifices, etc., refers to from 1 to about 2 million, from about 1000 to about 1.5 million, from about 10,000 to about 1 million of any such component found in the inkjet device, in embodiments, as to other components of the inkjet device, such as, the inkjet head, reservoir, feeder, etc., refers to from 1 to about 15, from 1 to about 8, from 1 to about 4 of any such component found in the inkjet device.

The inks can also be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate. An offset or indirect printing process is also disclosed in, for example, U.S. Pat. No. 5,389,958, the disclosure of which is incorporated herein by reference. Examples of apparatuses that are suitable for printing the solid inks described herein include apparatuses comprised of at least one ink retaining reservoir to store or hold solid ink, an ink jet head for printing the ink and an ink supply line for providing the solid ink to the ink jet head.

The ink can be jetted or transferred onto any suitable substrate or recording sheet to form an image including plain papers such as XEROX® 4200 papers, XEROX® Image Series papers, Courtland 4024 DP paper, ruled notebook paper, bond paper and the like; silica-coated papers, such as, Sharp Company silica-coated paper, JuJo paper, HAMMERMILL LASERPRINT® paper and the like; glossy papers, such as, XEROX® Digital Color Gloss, Sappi Warren Papers LUSTROGLOSS® and the like; transparency materials; fabrics; textile products; plastics; polymeric films; inorganic substrates such as metals, ceramics, wood; and the like.

The following examples of solid ink compositions further illustrate the foregoing embodiments. The Examples are illustrative of different compositions and conditions that can be utilized in practicing the disclosure. It will be apparent, however, that the disclosure can be practiced with many types of compositions and can have many different uses in accordance with the disclosure above and as pointed out hereinafter.

EXAMPLES

Example 1

Preparation of Ink 1

An ink was prepared by first mixing the following components by melting and homogeneously blending at 120° C. for 2 hours using an overhead stirrer to form Solution A: (1) 84.02 g of a distilled polyethylene wax from Baker Petrolite; (2) 16.96 g of a triamide wax ("triamide" is described in U.S. Pat. No. 6,860,930, the disclosure thereof incorporated herein by reference); (3) 27.68 g S-180 (a stearyl stearamide) commercially available from Crompton Corp., (4) 17.12 g of KE-100 resin, triglycerides of hydrogenated abietic (rosin) acid from Arakawa Chemical Industries, Ltd.; (5) 2.66 g of a urethane resin that is the adduct of three equivalents of stearyl isocyanate and a glycerol-based alcohol (prepared as described in Example 4 of U.S. Pat. No. 6,309,453, the disclosure thereof incorporated herein by reference in entirety; (6) 0.36 g of NAUGARD-445 (an antioxidant) available from Crompton Corp. and (7) 5.60 g of a dispersant as prepared in Example 14 of U.S. Pat. No. 7,973,186, the disclosure of which is incorporated herein by reference).

A Szegvari 01 attritor available from Union Process pre-heated to 120° C. was charged with 1800g 1/8 440 C Grade 25 stainless steel balls that were preheated to 120° C. and an appropriate amount of molten Solution A. The attritor was allowed to equilibrate for 30 minutes at which time a mixture of 4.00 g of C.I. Pigment Red 170 and 1.60 g C.I. Pigment Orange 34, both available from Clariant Corporation, were added. A multi-staged impeller was then attached to the attritor and the speed adjusted to give an impeller tip velocity of about 150 cm/s. The pigmented mixture was allowed to attrite overnight for 19 hours and then the resultant free-flowing ink concentrate was discharged and separated from the steel balls in the molten state.

The resulting pigmented ink was filtered at 120° C. through a 5 μm 304 SS stainless steel mesh available from McMaster Carr Supply Company.

The molten filtered ink was then poured into molds to form ink jet ink sticks and allowed to freeze at room temperature.

Example 2

Preparation of Ink 2

An ink was prepared by first mixing the following components by melting and homogeneously blending at 120° C. for 2 hours using an overhead stirrer to form Solution B: (1) 83.39 g of a distilled polyethylene wax from Baker Petrolite; (2) 16.83 g of a triamide wax ("triamide" is described in U.S. Pat. No. 6,860,930, the disclosure thereof incorporated herein by reference); (3) 27.47 g S-180 (a stearyl stearamide) commercially available from Crompton Corp., (4) 16.99 g of KE-100 resin, triglycerides of hydrogenated abietic (rosin) acid, from Arakawa Chemical Industries, Ltd.; (5) 2.64 g of a urethane resin that is the adduct of three equivalents of stearyl isocyanate and a glycerol-based alcohol (prepared as described in Example 4 of U.S. Pat. No. 6,309,453, the disclosure thereof incorporated herein by reference in entirety); (6) 0.36 g of NAUGARD-445 (an antioxidant) available from Crompton Corp. and (7) 6.16 g of a dispersant as prepared in Example 14 of U.S. Pat. No. 7,973,186, the disclosure of which is totally incorporated herein by reference.

A Szegvari 01 attritor available from Union Process pre-heated to 120° C. was charged with 1800.0 g 1/8 440 C Grade 25 stainless steel balls that were preheated to 120° C. and the appropriate amount of molten Solution B. The attritor-was allowed to equilibrate for 30 minutes at which time a mixture of 5.60 g of C.I. Pigment Red 170 and 0.56 g C.I. Pigment Orange 34, both available from Clariant Corporation, were added. A multi-staged impeller was then attached to the attritor and the speed adjusted to give an impeller tip velocity of about 150 cm/s. The pigmented mixture was allowed to attrite overnight for 19 hours on which the resultant free-flowing ink concentrate was discharged and separated from the steel balls in the molten state. The resulting pigmented ink was filtered at 120° C. through a 5 μm 304 SS stainless steel mesh available from McMaster Carr Supply Company.

The molten filtered ink was then poured into molds to form ink jet ink sticks and allowed to freeze at room temperature.

Example 3

A standard printing method is was used to prepare images using the ink of Example 1 (close approximation to PAN-TONE® Warm Red) and the ink of Example 2 (close approximation to PANTONE® Red 032). The inks were loaded in a Phaser® 8860 printer and jetted onto XEROX° Color Xpressions Plus paper such that the drop mass and 100% density resolution were 25 ng and 525 dpi×450 dpi, respectively. The various color attributes were evaluated using a Gretag MacBeth Spectrolino set to $D_{50}$ illuminant, 2° observer and ANSI A density. Table 1 below provides the obtained data.

TABLE 1

| | $\Delta E_{2000}$ values for solid inks | | |
|---|---|---|---|
| Example | $\Delta E_{2000}$ (min) | Calculated %-wt C.I. PO 34 | Calculated %-wt C.I. PR 170 |
| 1 | 1.8 | 1.00 | 2.50 |
| 2 | 1.2 | 3.50 | 0.35 |

Corresponding %-wt pigment concentrations were adjusted for solid ink formulations.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

We claim herein:

1. An ink comprising an ink vehicle that is a solid at room temperature, wherein said ink vehicle comprises a homogenous and uniform mix comprising ethylene/propylene copolymers, branched hydrocarbons, hydrocarbon-based waxes, paraffins, high molecular weight linear alcohols, microcrystalline waxes, polyethylene waxes, ester waxes, fatty acids, one or more amides, one or more resins and combinations thereof; and an orange pigment and red pigment, wherein said orange and red pigments are configured to provide a red color, wherein the orange pigment absorbs light having a wavelength of from about 400 nm to about 560 nm, and wherein said red pigment absorbs light having a wavelength of from about 510 nm to 580 nm, wherein said ink matches Red 032 or Warm Red in color, within a $\Delta E_{2000}$ of about 3 or less and wherein said ink is a solid from about 20° C. to about 27° C. and is a jetting liquid from about 50° C. to about 150° C., wherein the jetting liquid has a viscosity of from about 1 centipoise to about 40 centipoise.

2. The ink of claim 1, further comprising a shade-adjusting colorant.

3. The ink of claim 1, wherein said orange pigment is partially transmissive in the wavelength region of from about 560 nm to about 570 nm and transmissive in the region from about 570 to about 700 nm.

4. The ink of claim 1, wherein said red pigment is minimally transmissive from 380 nm to about 510 nm, is partially transmissive in the wavelength region of about 580 nm to about 590 nm, and is transmissive in the region of from about 590 nm to about 700 nm.

5. The ink of claim 1, consisting essentially of hydrocarbon-based waxes, microcrystalline waxes, polyethylene waxes, or ester waxes, said one or more resins, and said orange pigment and said red pigment.

6. The ink of claim 1, wherein said red pigment is selected from the group consisting of C.I. Pigment Red 1, C.I. Pigment Red 2, C.I. Pigment Red 3, C.I Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57: 1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 170:1, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, and combinations thereof.

7. The ink of claim 1, wherein said orange pigment is selected from the group consisting of C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66 and combinations thereof.

8. The ink of claim 1, wherein said red and orange pigments are present in an amount of from about 0.05% to about 6% by weight of said ink.

9. The ink of claim 1, wherein said ink vehicle is selected from the group consisting of ethylene/propylene copolymers, branched hydrocarbons, paraffins, high molecular weight linear alcohols, fatty acids and combinations thereof; wherein said colorant comprises an orange pigment and a red pigment, and said ink comprises one or more resins.

10. The ink of claim 1, wherein said ink vehicle further comprises an antioxidant.

11. The ink of claim 1, wherein said ink vehicle further comprises a dispersant.

12. The ink of claim 1, wherein said ink exhibits lightfastness of about 6 or greater on the Blue Wool Scale.

13. The ink of claim 1, wherein said ink has a hue angle from about 29° to about 35° and an L* from about 52 to about 61.

14. The ink of claim 1, wherein said red pigment comprises C.I. Pigment Red 170.

15. The ink of claim 1, wherein said orange pigment comprises C.I. Pigment Orange 34.

16. The ink of claim 1, wherein said ink matches Red 032 and comprises C.I. Pigment Red 170 in an amount of from about 1 to about 5 wt % and C.I. Pigment Orange 34 in an amount of from about 0.1 to about 0.75 wt %.

17. The ink of claim 1, wherein said ink matches Warm Red and comprises C.I Pigment Red 170 in an amount of from about 1.5 to about 4 wt % and C.I. Pigment Orange 34 in an amount of from about 0.5 to about 2.5 wt %.

18. A method of making the ink of claim 1 comprising: preparing a red colorant composition comprising an orange colorant and a red colorant; mixing said red colorant composition with an ink vehicle, one or more resins, and optionally one or more amides, an antioxidant a dispersant or combination thereof to form a mixture; heating said mixture; and cooling said heated mixture to form a solid ink block at temperatures from about 20° C. to about 27° C., wherein said ink matches Red 032 or Warm Red in color within a $\Delta E_{2000}$ of about 3 or less.

19. The method of claim 18, wherein said orange colorant comprises C.I. Pigment Orange 34 and said red colorant comprises C.I. Pigment Red 170.

20. The ink of claim 1, wherein said solid comprises a stick.

* * * * *